(12) United States Patent
Ikarashi et al.

(10) Patent No.: US 11,593,362 B2
(45) Date of Patent: Feb. 28, 2023

(54) SECURE AGGREGATE FUNCTION COMPUTATION SYSTEM, SECURE COMPUTATION APPARATUS, SECURE AGGREGATE FUNCTION COMPUTATION METHOD, AND PROGRAM

(71) Applicant: NIPPON TELEGRAPH AND TELEPHONE CORPORATION, Tokyo (JP)

(72) Inventors: Dai Ikarashi, Musashino (JP); Koki Hamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 91 days.

(21) Appl. No.: 17/057,120

(22) PCT Filed: May 14, 2019

(86) PCT No.: PCT/JP2019/019093
§ 371 (c)(1),
(2) Date: Nov. 20, 2020

(87) PCT Pub. No.: WO2019/225401
PCT Pub. Date: Nov. 28, 2019

(65) Prior Publication Data
US 2021/0191927 A1 Jun. 24, 2021

(30) Foreign Application Priority Data
May 25, 2018 (JP) .............................. JP2018-100626

(51) Int. Cl.
*H04L 9/08* (2006.01)
*H04L 9/06* (2006.01)
*G06F 16/242* (2019.01)

(52) U.S. Cl.
CPC ............ *G06F 16/244* (2019.01); *H04L 9/085* (2013.01); *H04L 2209/46* (2013.01)

(58) Field of Classification Search
None
See application file for complete search history.

(56) References Cited

U.S. PATENT DOCUMENTS

2018/0139190 A1* 5/2018 Chaum ................. G06F 21/602
2018/0357427 A1* 12/2018 Lindell ................... H04L 9/085

FOREIGN PATENT DOCUMENTS

EP        3096308 A1    11/2016
JP     2004062898 A   *   2/2004  ....... G06F 17/30949

OTHER PUBLICATIONS

Hamada K. et al: "An Algorithm for Computing Aggregate Median on Secure Function Evaluation", Computer Security Symposium 2012, Oct. 23, 2012 (Oct. 23, 2012), pp. 509-516 (Year: 2012).*

(Continued)

*Primary Examiner* — Saleh Najjar
*Assistant Examiner* — Shadi H Kobrosli
(74) *Attorney, Agent, or Firm* — Xsensus LLP

(57) ABSTRACT

To efficiently determine intermediate data for use with an aggregate function while keeping confidentiality, a bit decomposition unit generates a share of a bit string by bit decomposition and concatenation of key attributes. A group sort generation unit generates a share of a first permutation, which performs a stable sort of the bit string in ascending order. A bit string sorting unit generates a share of a sorted bit string obtained by sorting the bit string with the first permutation. A flag generation unit generates a share of a flag indicating a boundary between groups. A key aggregate sort generation unit generates a share of a second permutation, which performs a stable sort of the negation of the flag in ascending order. A de-duplication unit generates shares of de-duplicated key attributes. A key sorting unit generates (Continued)

shares of sorted key attributes by sorting the de-duplicated key attributes.

5 Claims, 3 Drawing Sheets

(56) References Cited

OTHER PUBLICATIONS

Laud P.: "Parallel Oblivious Array Access for Secure Multiparty Computation and Privacy-Preserving Minimum Spanning Trees", Proceedings on Privacy Enhancing Technologies, Jun. 1, 2015 (Jun. 1, 2015), p. 188-205 (Year: 2015).*

Koki Hamada et al., "An Algorithm for Computing Aggregate Median on Secure Function Evaluation", Computer Security Symposium 2012, vol. 2012, No. 3, Oct. 30, 2012-Nov. 1, 2012, pp. 509-516, total 16 pages; with the translation generated by computer.

Peeter Laud, "Parallel Oblivious Array Access for Secure Multi-party Computation and Privacy-Preserving Minimum Spanning Trees", Proceedings on Privacy Enhancing Technologies, 2015, pp. 188-205.

Dai Ikarashi et al., "A Design and an Implementation of Super-high-speed Multi-party Sorting: The Day When Multi-party Computation Reaches Scripting Languages", Computer Security Symposium 2017, Oct. 23-25, 2017, pp. 600-607, total 16 pages; with the translation generated by computer.

Ikarashi et al., "Secure Database Operations Using An Improved 3-party Verifiable Secure Function Evaluation", The 2011 Symposium on Cryptography and Information Security Kokura, Japan, The Institute of Electronics, Information and Communication Engineers, Jan. 25-28, 2011, pp. 1-8 (18 pages including English Translation).

* cited by examiner

SECURE AGGREGATE FUNCTION COMPUTATION SYSTEM, SECURE COMPUTATION APPARATUS, SECURE AGGREGATE FUNCTION COMPUTATION METHOD, AND PROGRAM

CROSS-REFERENCE TO RELATED APPLICATIONS

The present application is based on PCT filing PCT/JP2019/019093, filed May 14, 2019, which claims priority to JP 2018-100626, filed May 25, 2018, the entire contents of each are incorporated herein by reference.

TECHNICAL FIELD

The present invention relates to secure computation techniques, and in particular to techniques for calculating an aggregate function while keeping confidentiality.

BACKGROUND ART

An aggregate function is an operation to obtain statistical values that have been grouped based on the value of a key attribute when there are a key attribute and a value attribute in a table. An aggregate function is also called group-by operation. A key attribute is an attribute that is used for grouping table records, such as official position or gender, for example. A value attribute is an attribute that is used for calculating statistical values, such as salary or body height, for example. Group-by operation can be an operation to obtain the average body heights by gender when the key attribute is gender, for example. The key attribute may also be a composite key consisting of multiple attributes: for example, it may be an operation to obtain the average body height of males in their teens, the average body height of males in their twenties, and so on when the key attributes are gender and age. Non-Patent Literature 1 describes a method that performs group-by operation by secure computation.

Group-by operations specifically include group-by count, group-by sum, group-by maximum/minimum, group-by median, rank in group, and the like. Group-by count refers to cross tabulation, being an operation to sum up the number of records in each group when a table is grouped based on the value of a key attribute. Group-by sum is the sum of a desired value attribute in each group. Group-by maximum/minimum is the maximum/minimum of a desired value attribute in each group. Group-by median is the median of a desired value attribute in each group. Rank in group is a function for obtaining the rank of the value of a value attribute in each record within the group.

PRIOR ART LITERATURE

Non-Patent Literature

Non-Patent Literature 1: Dai Ikarashi, Koji Chida, Koki Hamada, and Katsumi Takahashi, "Secure Database Operations Using An Improved 3-party Verifiable Secure Function Evaluation", The 2011 Symposium on Cryptography and Information Security, 2011.

SUMMARY OF THE INVENTION

Problems to be Solved by the Invention

Group-by operation sometimes determines intermediate data in the course of calculation. Some of such intermediate data are determined in common between different kinds of group-by operations. When multiple group-by operations are calculated simultaneously or in succession while keeping confidentiality, processing for determining common intermediate data can overlap, which leads to an increased computational complexity.

In view of the technical problem described above, an object of the present invention is to provide a technique that can efficiently determine intermediate data for use in group-by operations when calculating multiple group-by operations simultaneously or in succession while keeping confidentiality.

Means to Solve the Problems

To solve the above-described problem, a secure aggregate function computation system according to one aspect of the present invention includes a plurality of secure computation apparatuses, where F is an arbitrary ring; m is an integer greater than or equal to 2; $n_k$ is an integer greater than or equal to 1; and $[k_0], \ldots, [k_{nk-1}]$ are shares obtained by secret sharing of key attributes $k_0, \ldots, k_{nk-1} \in F^m$. Each of the secure computation apparatuses includes: a group sort generation unit that generates, from a share $\{b\}$ which becomes a bit string $b := b_0, \ldots, b_{m-1}$ obtained by bit decomposition and concatenation of the key attributes $k_0, \ldots, k_{nk-1}$ when reconstructed, a share $\{\{\sigma_0\}\}$ that becomes a permutation $\sigma_0$ for performing a stable sort of the bit string b in ascending order when reconstructed, using the shares $[k_0], \ldots, [k_{nk-1}]$; a bit string sorting unit that generates a share $\{b'\}$ that becomes a sorted bit string $b' := b'_0, \ldots, b'_{m-1}$ which is the bit string b as sorted by the permutation $\sigma_0$ when reconstructed, using the share $\{b\}$ and the share $\{\{\sigma_0\}\}$; a flag generation unit that generates a share $\{e\}$ that becomes a flag $e := e_0, \ldots, e_{m-1}$ when reconstructed, using the share $\{b'\}$, by setting $\{e_i\} := \{b'_i \neq b'_{i+1}\}$ for each integer i greater than or equal to 0 and smaller than or equal to m−2 and also setting $\{e_{m-1}\} := \{1\}$; and a key aggregate sort generation unit that generates a share $\{\{\sigma\}\}$ that becomes a permutation $\sigma$ for performing a stable sort of negation ¬e of the flag e in ascending order when reconstructed, using the share $\{e\}$.

Effects of the Invention

The secure aggregate function techniques of the present invention can efficiently determine intermediate data for use in group-by operations while keeping confidentiality. By using the intermediate data, the overall computational complexity can be reduced when multiple group-by operations are calculated simultaneously or in succession.

DETAILED DESCRIPTION OF THE EMBODIMENTS

Figure 1:
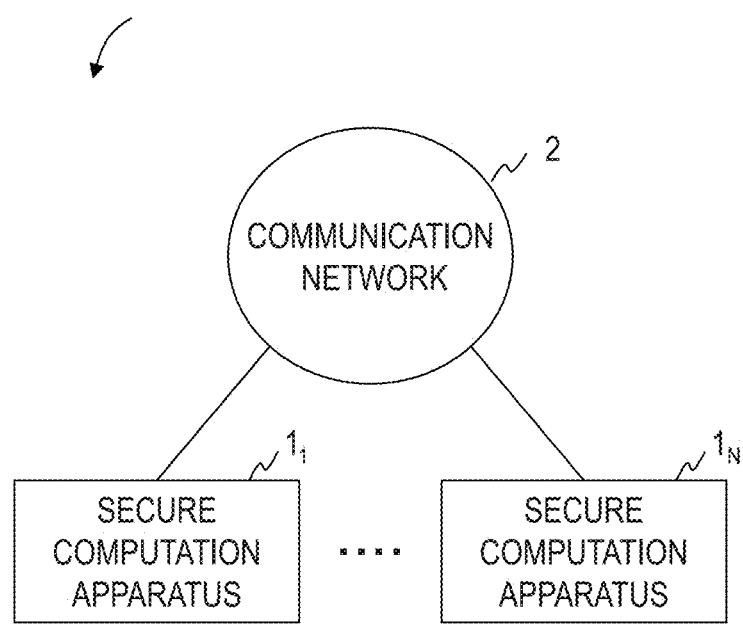
FIG. 1 illustrates a functional configuration of a secure aggregate function computation system.

Embodiments of the present invention are described below in detail. In the drawings, components having the same function are given the same numbers and overlapping description is omitted.

[x]∈[F] indicates that a certain value x is concealed by secret sharing and the like on a certain ring F. {b}∈{B} indicates that a certain one bit value b is concealed by secret sharing and the like on a ring B capable of representing one bit. {{s}}∈{{$S_m$}} indicates that a certain permutation s belonging to a set $S_m$ of permutations with m elements is concealed by secret sharing and the like. In the following, a secret-shared value is also called a "share".

For sorting (including stable sort) in secure computation used in an embodiment, the sorting described in Reference Literature 1 can be used, for example. For a share {{s}} of permutation s, the hybrid permutation {{π}} described in Reference Literature 1 may be used.

[Reference Literature 1] Dai Ikarashi, Koki Hamada, Ryo Kikuchi, and Koji Chida, "A Design and an Implementation of Super-high-speed Multi-party Sorting: The Day When Multi-party Computation Reaches Scripting Languages", Computer Security Symposium 2017.

Embodiment

Referring to FIG. 1, an exemplary configuration of a secure aggregate function computation system 100 according to an embodiment is described. The secure aggregate function computation system 100 includes N (≥2) secure computation apparatuses $1_1, \ldots, 1_N$. In the present embodiment, the secure computation apparatuses $1_1, \ldots, 1_N$ are respectively connected to a communication network 2. The communication network 2 is a circuit-switched or packet-switched communication network configured to allow mutual communications among the connected apparatuses, and, for example, the Internet, local area network (LAN), or wide area network (WAN) may be used. The apparatuses do not necessarily be capable of communicating online via the communication network 2. For example, they may be configured such that information entered to the secure computation apparatuses $1_1, \ldots, 1_N$ is stored in a portable recording medium such as magnetic tape or a USB memory and the information is entered offline to the secure computation apparatuses $1_1, \ldots, 1_N$ from the portable recording medium.

Figure 2:
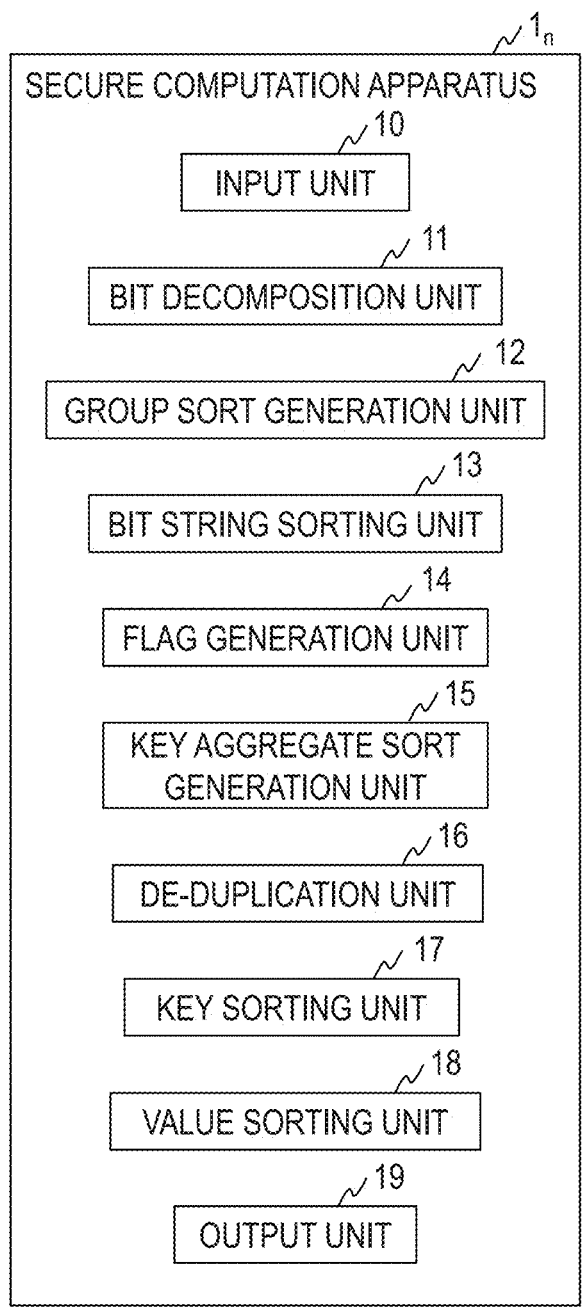
FIG. 2 illustrates a functional configuration of a secure computation apparatus.

Referring to FIG. 2, an exemplary configuration of a secure computation apparatus $1_n$ (n=1, ..., N) included in the secure aggregate function computation system 100 is described. The secure computation apparatus $1_n$ includes, for example, an input unit 10, a bit decomposition unit 11, a group sort generation unit 12, a bit string sorting unit 13, a flag generation unit 14, a key aggregate sort generation unit 15, a de-duplication unit 16, a key sorting unit 17, a value sorting unit 18, and an output unit 19, as shown in FIG. 2. By the secure computation apparatus $1_n$ (1≤n≤N) performing processing at the steps described below in cooperation with other secure computation apparatus $1_{n'}$ (n'=1, ..., N, where n≠n'), a secure aggregate function computation method according to an embodiment is implemented.

The secure computation apparatus $1_n$ is a special apparatus configured by loading of a special program into a well-known or dedicated computer having a central processing unit (CPU), main storage unit (random access memory: RAM), and the like, for example. The secure computation apparatus $1_n$ executes various kinds of processing under control of the central processing unit, for example. Data input to the secure computation apparatus $1_n$ and data resulting from processing are stored in the main storage unit, for example, and the data stored in the main storage unit is read into the central processing unit as necessary to be used for other processing. The processing units of the secure computation apparatus $1_n$ may at least partially consist of hardware such as an integrated circuit.

Figure 3:
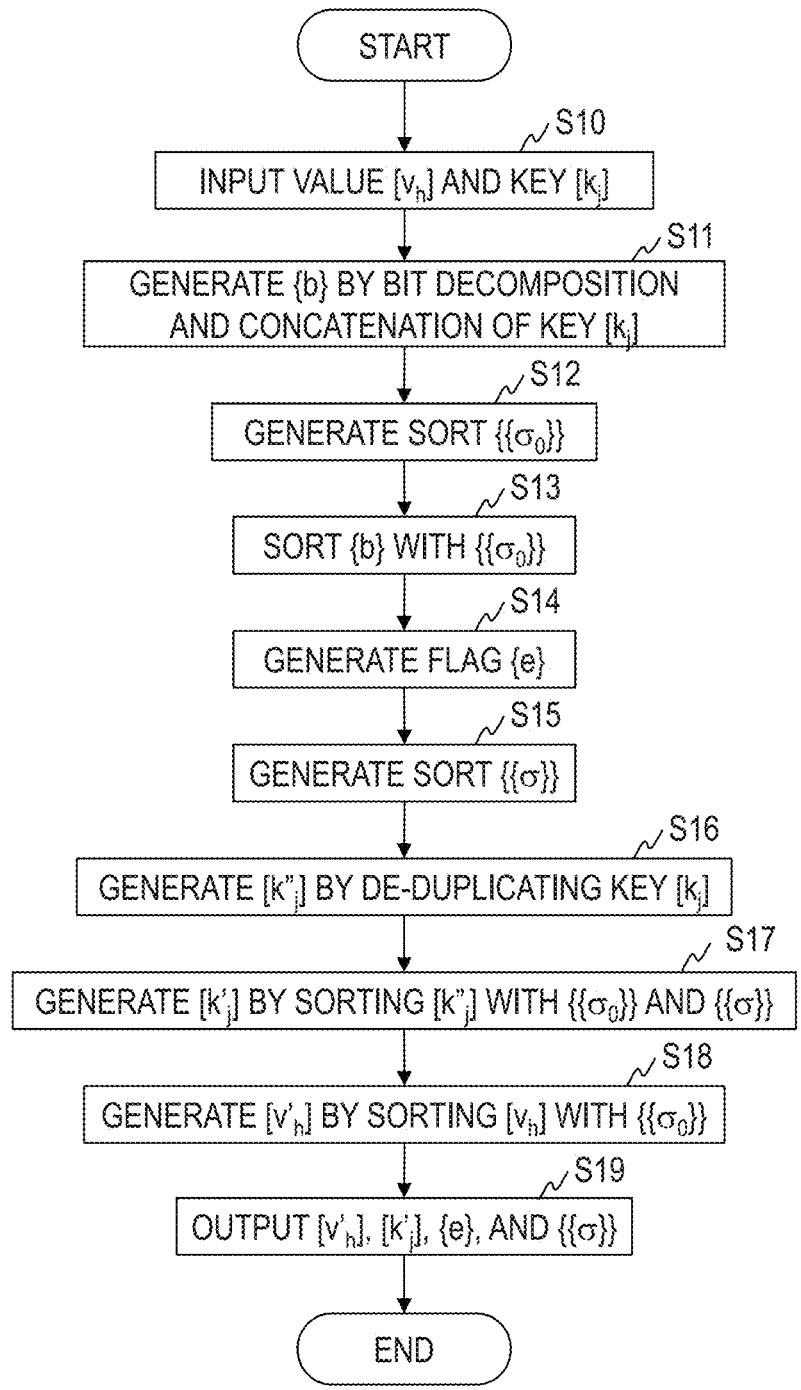
FIG. 3 illustrates a processing procedure of a secure aggregate function computation method.

Referring to FIG. 3, the processing procedure of the secure aggregate function computation method for execution by the secure aggregate function computation system 100 according to the embodiment is described.

At step S10, the input unit 10 of each secure computation apparatus $1_n$ receives, as input, shares $[k_0], \ldots, [k_{nk-1}] \in [F]^m$ which are obtained by concealing respective ones of $n_k$ key attributes $k_0, \ldots, k_{nk-1} \in F^m$ by secret sharing and shares $[v_0], \ldots, [v_{na-1}] \in [F]^m$ which are obtained by concealing respective ones of $n_a$ value attributes $v_0, \ldots, v_{na-1} \in F^m$ by secret sharing. Here, $n_k$ and $n_a$ are integers greater than or equal to 1, and m is an integer greater than or equal to 2. In the following, each element of $[k_j] \in [F]^m$ (j=0, ..., $n_k$-1) can also be referred to by $[k_{j,i}] \in [F]$ (i=0, ..., m-1). Likewise, each element of $[v_h] \in [F]^m$ (h=0, ..., $n_a$-1) can also be referred to by $[v_{h,i}] \in [F]$ (i=0, ..., m-1). The input unit 10 outputs the shares $[k_0], \ldots, [k_{nk-1}]$ of the key attributes $k_0, \ldots, k_{nk-1}$ to the bit decomposition unit 11 and the de-duplication unit 16. The input unit 10 also outputs the shares $[v_0], \ldots, [v_{na-1}]$ of the value attributes $v_0, \ldots, v_{na-1}$ to the value sorting unit 18.

At step S11, the bit decomposition unit 11 of each secure computation apparatus $1_n$ applies bit decomposition to the shares $[k_0], \ldots, [k_{nk-1}]$ of the key attributes $k_0, \ldots, k_{nk-1}$ and concatenates them, obtaining a share $\{b\} \in \{B\}^\lambda$ that becomes a bit string $b:=b_0, \ldots, b_{m-1} \in B^\lambda$ which is a concatenation of bit representations of the key attributes $k_0, \ldots, k_{nk-1}$ when reconstructed. Here, λ is the bit length of the bit string b, being the sum of the bit length of each $b_i$ (i=0, ..., m-1). In other words, $\{b_i\}$ is a bit string obtained by concatenation of bit representations of the respective ith elements $[k_{0,i}], \ldots, [k_{nk-1,i}]$ of the shares $[k_0], \ldots, [k_{nk-1}]$ of the key attributes $k_0, \ldots, k_{nk-1}$. The bit decomposition unit 11 outputs the share $\{b\}$ of the bit string b to the group sort generation unit 12.

At step S12, the group sort generation unit 12 of each secure computation apparatus $1_n$ generates a share $\{\{\sigma_0\}\} \in \{\{S_m\}\}$ that becomes a permutation $\sigma_0$ for performing a stable sort of the bit string b in ascending order when reconstructed, using the share $\{b\}$ of the bit string b. A stable sort refers to a kind of sorting operation that preserves an order among elements having the same value in a case where elements of the same value exist. For example, when a stable sort by gender is performed on a table that has been sorted by employee number, it yields a sorting result in which the order of employee numbers is maintained in each gender. As the bit string b is a concatenation of bit representations of the key attributes $k_0, \ldots, k_{nk-1}$, the permutation $\sigma_0$ can also be considered as an operation to rearrange records so that records for which the values of the key attributes $k_0, \ldots, k_{nk-1}$ are equal will be consecutive and group them. The group sort generation unit 12 outputs the share $\{b\}$ of the bit string b and the share $\{\{\sigma_0\}\}$ of the permutation $\sigma_0$ to the bit string sorting unit 13. The group sort generation unit 12 also outputs the share $\{\{\sigma_0\}\}$ of the permutation $\sigma_0$ to the key sorting unit 17 and the value sorting unit 18.

At step S13, the bit string sorting unit 13 of each secure computation apparatus $1_n$ obtains a share $\{b'\} \in \{B\}^\lambda$ that becomes a sorted bit string $b':=b'_0, \ldots, b'_{m-1} \in B^\lambda$ which is the bit string b as sorted by the permutation $\sigma_0$ when reconstructed, using the share $\{b\}$ of the bit string b and the share $\{\{\sigma_0\}\}$ of the permutation $\sigma_0$. The bit string sorting unit 13 outputs the share $\{b'\}$ of the sorted bit string b' to the flag generation unit 14.

At step S14, the flag generation unit 14 of each secure computation apparatus $1_n$ generates a share $\{e\}\in\{B\}^m$ that becomes a flag $e:=e_0, \ldots, e_{m-1}\in B^m$ when reconstructed, using the share $\{b'\}$ of the sorted bit string $b'$ by setting $\{e_i\}:=\{b'_i\neq b'_{i+1}\}$ for each integer i greater than or equal to 0 and smaller than or equal to m−2 and setting $\{e_{m-1}\}:=\{1\}$. Since the flag $e_i$ is set to true when the ith element $b'_i$ of the sorted bit string $b'$ is different from the i+1th element $b'_{i+1}$, it serves as a flag that indicates the last element of each group (that is, the element immediately before the boundary between groups). The flag generation unit 14 outputs the share $\{e\}$ of the flag e to the key aggregate sort generation unit 15, the de-duplication unit 16, and the output unit 19.

At step S15, the key aggregate sort generation unit 15 of each secure computation apparatus $1_n$ first generates a share $\{e'\}\in\{B\}^m$ that becomes a flag e' which is negation ¬e of the flag e when reconstructed, using the share $\{e\}$ of the flag e. That is, $\{e'_i\}:=\{\neg e_i\}$ is set for each integer i greater than or equal to 0 and smaller than or equal to m−1. Then, the key aggregate sort generation unit 15 generates a share $\{\{\sigma\}\}\in\{\{S_m\}\}$ that becomes a permutation σ for performing a stable sort of the flag e' in ascending order when reconstructed, using the share $\{e'\}$ of the flag e'. The key aggregate sort generation unit 15 outputs the share $\{\{\sigma\}\}$ of the permutation a to the key sorting unit 17 and the output unit 19.

At step S16, the de-duplication unit 16 of each secure computation apparatus $1_n$ generates shares $[k''_0], \ldots, [k''_{nk-1}]$ that become de-duplicated key attributes $k''_0, \ldots, k''_{nk-1}$ when reconstructed, using the share $\{e\}$ of the flag e and the shares $[k_0], \ldots, [k_{nk-1}]$ of the key attributes $k_0, \ldots, k_{nk-1}$ by setting $[k''_{j,i}]:=[e_i?k_{j,i}:null]$. Here, "?" is a conditional operator (or a tertiary operator). That is, $[k''_{j,i}]:=[k_{j,i}]$ is set when $\{e_i\}$ is true (for example, $\{e_i\}=\{1\}$), and $[k''_{j,i}]:=$null is set when $\{e_i\}$ is false (for example, $\{e_i\}=\{0\}$). The value that is set when $\{e_i\}=\{0\}$ does not have to be null, but may be any value that cannot be assumed by the key attributes $k_0, \ldots, k_{nk-1}$. Since the flag e is a flag which sets true only in the last element of each group, the de-duplicated key attributes $k''_0, \ldots, k''_{nk-1}$ will be a vector in which only elements corresponding to the last element of the respective groups are set to values of the key attribute and the other elements are set to a predetermined value that cannot be assumed by the key attributes. The de-duplication unit 16 outputs the shares $[k''_0], \ldots, [k''_{nk-1}]$ of the de-duplicated key attributes $k''_0, \ldots, k''_{nk-1}$ to the key sorting unit 17.

At step S17, the key sorting unit 17 of each secure computation apparatus $1_n$ generates shares $[k'_0], \ldots, [k'_{nk-1}]$ that become sorted key attributes $k'_0, \ldots, k'_{nk-1}$ which are the de-duplicated key attributes $k''_0, \ldots, k''_{nk-1}$ as sorted by the permutation $\sigma_0$ and the permutation σ in sequence when reconstructed, using the shares $[k''_0], \ldots, [k''_{nk-1}]$ of the de-duplicated key attributes $k''_0, \ldots, k''_{nk-1}$, the share $\{\{\sigma_0\}\}$ of the permutation $\sigma_0$, and the share $\{\{\sigma\}\}$ of the permutation σ. The key sorting unit 17 outputs the shares $[k'_0], \ldots, [k'_{nk-1}]$ of the sorted key attributes $k'_0, \ldots, k'_{nk-1}$ to the output unit 19.

At step S18, the value sorting unit 18 of each secure computation apparatus $1_n$ generates shares $[v'_0], \ldots, [v'_{na-1}]$ that become sorted value attributes $v'_0, \ldots, v'_{na-1}$ which are the value attributes $v_0, \ldots, v_{na-1}$ as sorted by the permutation $\sigma_0$ when reconstructed, using the shares $[v_0], \ldots, [v_{na-1}]$ of the value attributes $v_0, \ldots, v_{na-1}$ and the share $\{\{\sigma_0\}\}$ of the permutation $\sigma_0$. The value sorting unit 18 outputs the shares $[v'_0], \ldots, [v'_{na-1}]$ of the sorted value attributes $v'_0, \ldots, v'_{na-1}$ to the output unit 19.

At step S19, the output unit 19 of each secure computation apparatus $1_n$ outputs at least one of the shares $[k'_0], \ldots, [k'_{nk-1}]$ of the sorted key attributes $k'_0, \ldots, k'_{nk-1}$, the shares $[v'_0], \ldots, [v'_{na-1}]$ of the sorted value attributes $v'_0, \ldots, v'_{na-1}$, the share $\{e\}$ of the flag e, and the share $\{\{\sigma\}\}$ of the permutation σ. Information to be output by the output unit 19 is selected so as to satisfy intermediate data which is required for one or more group-by operations that are subsequently calculated.

In the following, specific procedures to calculate various kinds of aggregate functions using the intermediate data output by the secure aggregate function computation system 100 are described.

<<Group-by Count>>

Group-by count is an operation to sum up the number of records in each group when a table is grouped based on the value of a key attribute. Group-by count can be determined as shown below using the share $\{e\}$ of the flag e and the share $\{\{\sigma\}\}$ of the permutation σ which are output by the secure aggregate function computation system 100. Here, g is the maximum number of groups, representing the number of combinations of possible values of key attributes, that is, the number of kinds of possible values of the key attributes.

Firstly, the share $\{e\}\in\{B\}^m$ of the flag e is converted to a share $[e]\in[F]^m$ by secret sharing on an arbitrary ring F.

Secondly, using the share [e] of the flag e, $[x_i]:=[e_i?i+1:m]$ is set for each integer i greater than or equal to 0 and smaller than or equal to m−1, and a share $[x]\in[F]^m$ that becomes a vector $x:=x_0, \ldots, x_{m-1}\in F$ when reconstructed is generated. The vector x is such that, where records having the same value of a key attribute are placed in the same group when a stable sort is performed on a table by the key attribute, the position of the next element from beginning is set in the last element of each group, and the number of records contained in the entire table is set in the other elements. In other words, in the last element of each group, the total number of records summed up from the first group through that group will be set.

Thirdly, using the share [x] of the vector x and the share $\{\{\sigma\}\}$ of the permutation σ, a share $[\sigma(x)]\in[F]^m$ that becomes a sorted vector σ(x) which is the vector x as sorted by the permutation σ when reconstructed is generated. In the following, each element of $[\sigma(x)]\in[F]^m$ can also be referred to by $[\sigma(x)_i]\in[F]$ (i=0, ..., m−1).

Finally, using the share $[\sigma(x)]$ of the sorted vector σ(x), $[c_i]: [\sigma(x)_i-\sigma(x)_{i-1}]$ is set for each integer i greater than or equal to 1 and smaller than or equal to min(g,m)−1, and $[c_0]:=[\sigma(x)_0]$ is also set, and a share $[c]\in[F]^{min(g,m)}$ that becomes a vector $c:=c_0, \ldots, c_{min(g,m)-1}\in F$ representing the number of records in each group when reconstructed is generated. Since the total number of records summed up from the 0th through ith groups is set in the ith element $\sigma(x)_i$ of the sorted vector σ(x), the number of records in the ith group will be set in the ith element $c_i$ of the vector c. Because the key attributes are concealed, min(g,m) is the maximum that can be assumed by the number of groups, and the actual number of groups will be a value that is equal to or smaller than min(g,m) and that cannot be known to each secure computation apparatus $1_n$ (hereinbelow, the actual number of groups is denoted as g'). Thus, for those of min(g,m) shares $[c_i]$ that exceed the actual number of groups (that is, i≥g'), it is necessary to set an invalid value that becomes distinguishable from a valid value after reconstruction. In the present embodiment, $[x_i]=m$ is set for those shares $[x_i]$ with $[e_i]$ being false or the last share $[x_i]$ among those with $[e_i]$ being true. Thus, $\sigma(x)_i-\sigma(x)_{i-1}=m-m=0$ is set for $c_{g'}, \ldots, c_{min(g,m)-1}$. Since the count of groups in which records exist is one or greater, 0 is applicable as an invalid value that becomes distinguishable from a valid value.

<<Group-by Sum>>

Group-by sum is an operation to sum up the sum of a desired value attribute per group when a table is grouped based on the value of a key attribute. Use of group-by sum also allows calculation of group-by multiply accumulate, which determines the sum of multiplications per group, or group-by sum of squares, which determines the sum of squares per group. For group-by multiply accumulate, group-by sum may be determined on a result of applying multiplication to the value attribute in each record. For group-by sum of squares, group-by sum may be similarly determined on a result of applying squaring to the value attribute in each record. Group-by sum can be determined as shown below using the shares $[v'_0], \ldots, [v'_{na-1}]$ of the sorted value attributes $v'_0, \ldots, v'_{na-1}$, the share $\{e\}$ of the flag e, and the share $\{\{\sigma\}\}$ of the permutation $\sigma$ which are output by the secure aggregate function computation system 100. Here, v is a desired value attribute for which group-by sum is to be determined among the sorted value attributes $v'_0, \ldots, v'_{na-1}$.

Firstly, $[v']:=\text{prefix-sum}([v])$ is calculated using the share $[v]$ of the value attribute v, and a share $[v'] \in [F]^m$ that becomes a vector $v':=v'_0, \ldots, v'_{m-1} \in F$ when reconstructed is generated. The prefix-sum is an operation to set the sum of the values of the 0th element $v_0$ through the ith element $v_i$ of the input vector v into the ith element $v'_i$ of the output vector v', for each integer i greater than or equal to 0 and smaller than or equal to m−1, where m is the length of the input vector v.

Secondly, the share $\{e\} \in \{B\}^m$ of the flag e is converted to the share $[e] \in [F]^m$ by secret sharing on an arbitrary ring F.

Thirdly, using the share $[v']$ of the vector v' and the share $[e]$ of the flag e, $[t_i]:=[e_i?v'_i:v'_{m-1}]$ is set for each integer i greater than or equal to 0 and smaller than or equal to m−1, and a share $[t] \in [F]^m$ that becomes a vector $t:=t_0, \ldots, t_{m-1} \in F$ when reconstructed is generated. The vector t is such that, where records having the same value of a key attribute are placed in the same group when a stable sort is performed on a table by the key attribute, the sum of the values of the value attribute preceding the last element of each group is set in the last element, and the sum of the values of the value attribute in the entire table is set in the other elements.

Fourthly, using the share $[t]$ of the vector t and the share $\{\{\sigma\}\}$ of the permutation $\sigma$, a share $[\sigma(t)] \in [F]^m$ that becomes a sorted vector $\sigma(t)$ which is the vector t as sorted by the permutation $\sigma$ when reconstructed is generated. In the following, each element of $[\sigma(t)] \in [F]^m$ can also be referred to by $[\sigma(t)_i] \in [F]$ (i=0, ..., m−1).

Finally, using the share $[\sigma(t)]$ of the sorted vector $\sigma(t)$, $[s_i]:=[\sigma(t)_i-\sigma(t)_{i-1}]$ is set for each integer i greater than or equal to 1 and smaller than or equal to min(g,m)−1 and $[t_0]:=[\sigma(t)_0]$ is also set, and a share $[s] \in [F]^{min(g,m)}$ that becomes the sum of value attribute v per group, $s:=s_0, \ldots, s_{min(g,m)-1} \in F$, when reconstructed is generated. Since the ith element $\sigma(t)_i$ of the sorted vector $\sigma(t)$ has been set to the sum of the values of the value attribute v belonging to the 0th through the ith groups, the sum of the values of the value attribute v belonging to the ith group will be set in the ith element $t_i$ of the vector t.

<<Group-by Maximum>>

Group-by maximum is an operation to obtain the maximum of a desired value attribute per group when a table is grouped based on the value of a key attribute. Group-by maximum can be determined as shown below using the shares $[v'_0], \ldots, [v'_{na-1}]$ of the sorted value attributes $v'_0, \ldots, v'_{na-1}$, the share $\{e\}$ of the flag e, and the share $\{\{\sigma\}\}$ of the permutation $\sigma$ which are output by the secure aggregate function computation system 100. Here, v is a desired value attribute for which group-by maximum is to be determined among the sorted value attributes $v'_0, \ldots, v'_{na-1}$.

Firstly, the share $\{e\} \in \{B\}^m$ of the flag e is converted to the share $[e] \in [F]^m$ by secret sharing on an arbitrary ring F.

Secondly, using the share $[v]$ of the value attribute v and the share $[e]$ of the flag e, $[f_i]:=[e_i?v_i:0]$ is set for each integer i greater than or equal to 0 and smaller than or equal to m−1, and a share $[f] \in [F]^m$ that becomes a vector $f:=f_0, \ldots, f_{m-1} \in F$ when reconstructed is generated. The vector f is such that, where records having the same value of a key attribute are placed in the same group when a stable sort is performed on a table by the key attribute, the value $v_i$ of the value attribute corresponding to the last element $f_i$ of each group is set in the last element $f_i$, and 0 is set in the other elements. That is, it is a vector having the maximums of the respective groups and 0s as its elements.

Thirdly, using the share $[f]$ of the vector f and the share $\{\{\sigma\}\}$ of the permutation $\sigma$, a share $[\sigma(f)] \in [F]^m$ that becomes a sorted vector $\sigma(f)$ which is the vector f as sorted by the permutation $\sigma$ when reconstructed is generated. In the following, each element of $[\sigma(f)] \in [F]^m$ can also be referred to by $[\sigma(f)_i] \in [F]$ (i=0, ..., m−1). The sorted vector $\sigma(f)$ will be a vector in which the value of the last element when sorted by group (that is, the maximum in each group) is set in elements as many as the number of groups from beginning and 0 is set in the subsequent elements.

Finally, from the share $[\sigma(f)]$ of the sorted vector $\sigma(f)$, the share $[x] \in [F]^{min(g,m)}$ that becomes the vector $x:=\sigma(f)_0, \ldots, \sigma(f)_{min(g,m)-1}$ representing the maximum in each group when reconstructed is generated.

<<Group-by Minimum>>

Group-by minimum is an operation to obtain the minimum of a desired value attribute per group when a table is grouped based on the value of a key attribute. Group-by minimum can be determined as shown below using the shares $[v'_0], \ldots, [v'_{na-1}]$ of the sorted value attributes $v'_0, \ldots, v'_{na-1}$, the share $\{e\}$ of the flag e, and the share $\{\{\sigma\}\}$ of the permutation $\sigma$ which are output by the secure aggregate function computation system 100. Here, v is a desired value attribute for which group-by minimum is to be determined among the sorted value attributes $v'_0, \ldots, v'_{na-1}$.

Firstly, using the share $\{e\}$ of the flag e, $\{e'_i\}:=\{e_{i-1}\}$ is set for each integer i greater than or equal to 1 and smaller than or equal to m−1 and $\{e'_0\}:=\{1\}$ is also set, and a share $\{e'\} \in \{B\}^m$ that becomes a flag $e':=e'_0, \ldots, e'_{m-1} \in B^m$ when reconstructed is generated. Since the flag e' is a flag equivalent to the flag e indicating the last element of each group as shifted backward by one, it serves as a flag that indicates the first element of each group (that is, the element immediately after the boundary between groups).

Secondly, the share $\{e'\} \in \{B\}^m$ of the flag e' is converted to a share $[e'] \in [F]^m$ by secret sharing on an arbitrary ring F.

Thirdly, using the share $[v]$ of the value attribute v and the share $[e']$ of the flag e', $[f'_i]:=[e'_i?v_i:0]$ is set for each integer i greater than or equal to 0 and smaller than or equal to m−1, and a share $[f'] \in [F]^m$ that becomes a vector $f':=f'_0, \ldots, f'_{m-1} \in F$ when reconstructed is generated. The vector f' is such that, where records having the same value of a key attribute are placed in the same group when a stable sort is performed on a table by the key attribute, the value $v_i$ of the value attribute corresponding to the first element $f'_i$ of each group is set in the element $f'_i$, and 0 is set in the other elements. That is, it is a vector having the minimums of the respective groups and 0s as its elements.

Fourthly, using the share [f'] of the vector f' and the share {{σ}} of the permutation σ, a share [σ(f')]∈[F]$^m$ that becomes a sorted vector σ(f') which is the vector f' as sorted by the permutation σ when reconstructed is generated. In the following, each element of [σ(f')]∈[F]$^m$ can also be referred to by [σ(f')$_i$]∈[F] (i=0, . . . , m−1). The sorted vector σ(f') will be a vector in which the value of the first element when sorted by group (that is, the minimum in each group) is set in elements as many as the number of groups from beginning and 0 is set in the subsequent elements.

Finally, from the share [σ(f')] of the sorted vector σ(f'), a share [x']∈[F]$^{min(g,m)}$ that becomes a vector x':=σ(f')$_0$, . . . , σ(f')$_{min(g,m)-1}$ representing the minimum in each group when reconstructed is generated.

<<Ascending-Order Rank in Group>>

Ascending-order rank in group is an operation to obtain the rank of a value of a desired value attribute within a group when it is sorted in ascending order in the case of grouping a table based on the value of a key attribute. Ascending-order rank in group can be determined as shown below using the share {e} of the flag e and the share {{σ}} of the permutation σ which are output by the secure aggregate function computation system 100. Here, c is a result of group-by count (hereinafter called "cross tabulation"). The cross tabulation c can be determined with the share {e} of the flag e and the share {{σ}} of the permutation σ in accordance with the <<group-by count>> procedure described above, for example.

Firstly, using the share [c] of the cross tabulation c and the share {{σ}} of the permutation σ, a share [u]:=[σ$^{-1}$(c)]∈[F]$^m$ that becomes an inverse-permuted cross tabulation u:=σ$^{-1}$(c) which is obtained by inverse application of the permutation σ to the cross tabulation c when reconstructed is generated. The cross tabulation c is a vector in which the number of records in each group is set in elements as many as the number of groups from beginning, and the permutation σ is a permutation that arranges the last element of each group from beginning. Thus, the inverse-permuted cross tabulation u, obtained by inverse application of the permutation σ to the cross tabulation c, will be a vector in which the number of records in each group is set in the last element of that group. In the following, each element of [u]∈[F]$^m$ can also be referred to by [u$_i$]∈[F] (i=0, . . . , m−1).

Secondly, [s]:=prefix-sum([u]) is calculated using the share [u] of the inverse-permuted cross tabulation u, and a share [s]∈[F]$^m$ that becomes a vector s:=s$_0$, . . . , s$_{m-1}$∈F when reconstructed is generated. The prefix-sum is an operation to set the sum of the values of the 0th element u$_0$ through the ith element u$_i$ of the input vector u into the ith element s$_i$ of the output vector s for each integer i greater than or equal to 0 and smaller than or equal to m−1, where m is the length of the input vector u.

Finally, using the share [s] of the vector s, [a$_i$]:=[i−s$_{i-1}$] is set for each integer i greater than or equal to 1 and smaller than or equal to m−1 and [a$_0$]:=[0] is also set, and a share [a]∈[F]$^m$ that becomes the ascending-order rank in group, a:=a$_0$, . . . , a$_{m-1}$∈F, when reconstructed is generated. Note that the ascending-order rank in group starts at 0. For obtaining ranks starting at 1, each rank may be incremented. That is, [a$_i$]:=[i−s$_{i-1}$+1] may be set for each integer i greater than or equal to 1 and smaller than or equal to m−1 and [a$_0$]:=[1] may be also set, and then the ascending-order rank a may be generated.

<<Descending-Order Rank in Group>>

Descending-order rank in group is an operation to obtain the rank of a value of a desired value attribute within a group when it is sorted in descending order in the case of grouping a table based on the value of the key attribute. Descending-order rank in group can be determined as shown below using the share {e} of the flag e and the share {{σ}} of the permutation σ which are output by the secure aggregate function computation system 100. Here, c is a result of group-by count (hereinafter called "cross tabulation"). The cross tabulation c can be determined with the share {e} of the flag e and the share {{σ}} of the permutation σ in accordance with the <<group-by count>> procedure described above, for example.

Firstly, using the share [c] of the cross tabulation c, [c'$_i$]:=[c$_{i+1}$] is set for each integer i greater than or equal to 0 and smaller than or equal to m−2 and [c'$_{m-1}$]:=[0] is also set, and a share [c']∈[F]$^m$ that becomes a shifted cross tabulation c':=c'$_0$, . . . , c'$_{m-11}$∈F$^m$ when reconstructed is generated. The shifted cross tabulation c' is a vector equivalent to the cross tabulation c, which is a vector representing the number of records in each group, as shifted forward by one.

Secondly, using the share [c'] of the shifted cross tabulation c' and the share {{σ}} of the permutation σ, a share [u']:=[σ$^{-1}$(c')]∈[F]$^m$ that becomes an inverse-permuted cross tabulation u':=σ$^{-1}$(c') which is obtained by inverse application of the permutation σ to the shifted cross tabulation c' when reconstructed is generated. The shifted cross tabulation c' is a vector obtained by shifting the cross tabulation c, in which the number of records in each group is set in elements as many as the number of groups from beginning, forward by one, and the permutation σ is a permutation that arranges the last elements of each group from beginning. Thus, the inverse-permuted cross tabulation u', obtained by inverse application of the permutation σ to the shifted cross tabulation c', will be a vector in which the number of records of the immediately subsequent group is set in the last element of each group. In the following, each element of [u']∈[F]$^m$ can also be referred to by [u'$_i$]∈[F] (i=0, . . . , m−1).

Thirdly, [s']:=postfix-sum([u']) is calculated using the share [u'] of the inverse-permuted cross tabulation u', and a share [s']∈[F]$^m$ that becomes a vector s':=s'$_0$, . . . , s'$_{m-1}$∈F when reconstructed is generated. The postfix-sum is an operation to set the sum of the values of the ith element u'$_i$ through the m−1th element u'$_{m-1}$ of the input vector u' into the ith element s'$_i$ of the output vector s', for each integer i greater than or equal to 0 and smaller than or equal to m−1, where m is the length of the input vector u'.

Finally, using the share [s'] of the vector s', [d$_i$]:=[m−i−s'$_i$−1] is set for each integer i greater than or equal to 0 and smaller than or equal to m−1, and a share [d]∈[F]$^m$ that becomes the descending-order rank in group, d:=d$_0$, . . . , d$_{m-1}$∈F, when reconstructed is generated. Note that the descending-order rank in group starts at 0. For obtaining ranks starting at 1, each rank may be incremented. That is, [d$_i$]:=[m−i−s'$_i$] may be set for each integer i greater than or equal to 0 and smaller than or equal to m−1, and then the descending-order rank d may be generated.

<<Group-by Median>>

Group-by median is an operation to obtain a median of a desired value attribute per group when a table is grouped based on the value of a key attribute. Group-by median can be determined as shown below using the shares [v'$_0$], . . . , [v'$_{na-1}$] of the value attributes v'$_0$, . . . , v'$_{na-1}$ and the share {e} of the flag e, and the share {{σ}} of the permutation σ which are output by the secure aggregate function computation system 100. Here, c is a result of group-by count (hereinafter called "cross tabulation"). The cross tabulation c can be determined with the share $\{e\}$ of the flag e and the share $\{\{\sigma\}\}$ of the permutation $\sigma$ in accordance with the <<group-by count>> procedure described above, for example. v is a desired value attribute for which group-by median is to be determined among the sorted value attributes $v'_0, \ldots, v'_{na-1}$.

Firstly, using the share [c] of the cross tabulation c and the share $\{\{\sigma\}\}$ of the permutation $\sigma$, the share $[a] \in [F]^m$ that becomes the vector $a := a_0, \ldots, a_{m-1} \in F$ representing the ascending-order rank in group when reconstructed and the share $[d] \in [F]^m$ that becomes the vector $d := d_0, \ldots, d_{m-1} \in F$ representing the descending-order rank in group when reconstructed are generated. Here, the ascending-order rank and the descending-order rank are assumed to start at 1. The ascending-order rank in group can be determined in accordance with the <<ascending-order rank in group>> procedure described above, for example. The descending-order rank in group can be determined in accordance with the <<descending-order rank in group>> procedure described above, for example.

Secondly, using the share [a] of the ascending-order rank a and the share [d] of the descending-order rank d, $[2^\lambda + a - d]$, $[2^\lambda + d - a]$ are calculated for $\lambda$ satisfying $2^\lambda > m$, $[2^\lambda + a - d]$, $[2^\lambda + d - a]$ are subjected to bit decomposition into $\lambda$ bits, and a share $\{a-d\} \in \{B_\lambda\}^m$ that becomes a bit string a–d when reconstructed and a share $\{d-a\} \in \{B_\lambda\}^m$ that becomes a bit string d–a when reconstructed are generated.

Thirdly, the least significant bit is removed from the share $\{a-d\}$ of a–d and the share $\{d-a\}$ of d–a, and shares $\{a'\}$, $\{d'\} \in \{B_{\lambda-1}\}^m$ that become a', d' when reconstructed are generated. a' is a bit string obtained by removing the least significant bit of a–d, and d' is a bit string obtained by removing the least significant bit of d–a.

Fourthly, $\{a''\} := \{|a'=0|\}$, $\{d''\} := \{|d'=0|\}$ are calculated using the share $\{a'\}$ of a' and the share $\{d'\}$ of d', and shares $\{a''\}$, $\{d''\} \in \{B\}^m$ that become flags a", d"$\in B^m$ when reconstructed are generated. Here, |•| is a symbol that returns true or false of equation "•". The flags a", d" respectively indicate whether a–d, d–a are greater than or equal to 0 and smaller than or equal to 1. Further, a" indicates whether the record represents the greater median and d" indicates whether the record represents the smaller median.

Fifthly, the shares $\{a''\}$, $\{d''\} \in \{B\}^m$ of the flags a", d" are converted to shares [a"], [d"]$\in [F]^m$ by secret sharing on an arbitrary ring F.

Sixthly, $[v_a] := [va'']$, $[v_d] := [vd'']$ are calculated using the share [v] of the value attribute v and the shares $\{a''\}$, $\{d''\}$ of the flags a", d", and shares $[v_a]$, $[v_d] \in [F]^m$ that become vectors $v_a, v_d \in F^m$ when reconstructed are generated.

Seventhly, using the shares $\{a''\}$, $\{d''\}$ of the flags a", d", shares $\{\neg a''\}$, $\{\neg d''\} \in \{B\}^m$ that become negations $\neg a''$, $\neg d''$ of the flags a", d" when reconstructed are generated. Then, using the shares $\{\neg a''\}$, $\{\neg d''\}$ of the negations $\neg a''$, $\neg d''$ of the flags a", d", shares $\{\{\sigma_a\}\}$, $\{\{\sigma_d\}\} \in \{\{S_m\}\}$ that become permutations $\sigma_a$, $\sigma_d$ for sorting the negations $\neg a''$, $\neg d''$ of the flags a", d" when reconstructed are generated.

Finally, $[x] := [\sigma_a(v_a) + \sigma_d(v_d)]$ is calculated using the shares $[v_a]$, $[v_d]$ of the vectors $v_a$, $v_d$ and the shares $\{\{\sigma_a\}\}$, $\{\{\sigma_d\}\}$ of the permutations $\sigma_a$, $\sigma_d$, and the share $[x] \in [F]^m$ that becomes the vector x representing the median of each group when reconstructed is generated.

<Modifications>

The embodiment above showed a case of configurating each secure computation apparatus $1_n$ to output at least one of the shares $[k'_0], \ldots, [k'_{nk-1}]$ of the sorted key attributes $k'_0, \ldots, k'_{nk-1}$, the shares $[v'_0], \ldots, [v'_{na-1}]$ of the sorted value attributes $v'_0, \ldots, v'_{na-1}$, the share $\{e\}$ of the flag e, and the share $\{\{\sigma\}\}$ of the permutation $\sigma$. However, processing units to be included may be selected depending on the type of group-by operation to be subsequently calculated. For example, group-by count and group-by median are kinds of group-by operations that require the share $\{e\}$ of the flag e and the share $\{\{\sigma\}\}$ of the permutation $\sigma$. Group-by sum and group-by maximum/minimum are kinds of group-by operations that require the shares $[v'_0], \ldots, [v'_{na-1}]$ of the sorted value attributes $v'_0, \ldots, v'_{na-1}$, the share $\{e\}$ of the flag e, and the share $\{\{\sigma\}\}$ of the permutation $\sigma$. Rank in group is a kind of group-by operation that requires the share $\{e\}$ of the flag e and the share $\{\{\sigma\}\}$ of the permutation $\sigma$. That is, in a situation where group-by count, group-by median, or rank in group is calculated but group-by sum or group-by maximum/minimum is not calculated, it is sufficient that the secure aggregate function computation system 100 is able to output at least the share $\{e\}$ of the flag e and the share $\{\{\sigma\}\}$ of the permutation $\sigma$. Then, each secure computation apparatus $1_n$ could be configured to include the input unit 10, the bit decomposition unit 11, the group sort generation unit 12, the bit string sorting unit 13, the flag generation unit 14, the key aggregate sort generation unit 15, and the output unit 19, and not to include the de-duplication unit 16, the key sorting unit 17, and the value sorting unit 18, for example.

While the embodiments of the present invention have been described, specific configurations are not limited to these embodiments, but design modifications and the like within a range not departing from the spirit of the invention are encompassed in the scope of the invention, of course. The various processes described in the embodiments may be executed in parallel or separately depending on the processing ability of an apparatus executing the process or on any necessity, rather than being executed in time series in accordance with the described order.

[Program and Recording Medium]

When various types of processing functions in the apparatuses described in the above embodiments are implemented on a computer, the contents of processing function to be contained in each apparatus is written by a program. With this program executed on the computer, various types of processing functions in the above-described apparatuses are implemented on the computer.

This program in which the contents of processing are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program recorded in a portable recording medium or transferred from a server computer once in a storage unit thereof, for example. When the processing is performed, the computer reads out the program stored in the storage unit thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program in this form includes information which is provided for processing performed by electronic calculation equipment and which is equivalent to a program (such as data which is not a direct instruction to the computer but has a property specifying the processing performed by the computer).

In this form, the present apparatus is configured with a predetermined program executed on a computer. However, the present apparatus may be configured with at least part of these processing contents realized in a hardware manner.

What is claimed is:

1. A secure aggregate function computation system comprising:
   a plurality of secure computation apparatuses, wherein
   F is an arbitrary ring; m is an integer greater than or equal to 2; $n_k$ is an integer greater than or equal to 1; and $[k_0], \ldots, [k_{nk-1}]$ are shares obtained by secret sharing of key attributes $k_0, \ldots, k_{nk-1} \in F^m$, and
   each of the secure computation apparatuses comprising processing circuitry configured to:
   generate, from a share $\{b\}$ which becomes a bit string $b:=b_0, \ldots, b_{m-1}$ obtained by bit decomposition and concatenation of the key attributes $k_0, \ldots, k_{nk-1}$ when reconstructed, a share $\{\{\sigma_0\}\}$ that becomes a permutation $\sigma_0$ for performing a stable sort of the bit string b in ascending order when reconstructed, using the shares $[k_0], \ldots, [k_{nk-1}]$,
   generate a share $\{b'\}$ that becomes a sorted bit string $b':=b'_0, \ldots, b'_{m-1}$ which is the bit string b as sorted by the permutation $\sigma_0$ when reconstructed, using the share $\{b\}$ and the share $\{\{\sigma_0\}\}$,
   generate a share $\{e\}$ that becomes a flag $e:=e_0, \ldots, e_{m-1}$ when reconstructed, using the share $\{b'\}$, by setting $\{e_i\}:=\{b'_i \neq b'_{i+1}\}$ for each integer i greater than or equal to 0 and smaller than or equal to m−2 and also setting $\{e_{m-1}\}:=\{1\}$,
   generate a share $\{\{\sigma\}\}$ that becomes a permutation $\sigma$ for performing a stable sort of negation ¬e of the flag e in ascending order when reconstructed, using the share $\{e\}$, and
   output at least one of share $\{e\}$ and the share $\{\{\sigma\}\}$ as intermediate data which is required for one or more group-by operations that are subsequently calculated.

2. The secure aggregate function computation system according to claim 1, wherein
   $n_a$ is an integer greater than or equal to 1; and $[v_0], \ldots, [v_{na-1}]$ are shares obtained by secret sharing of value attributes $v_0, \ldots, v_{na-1} \in F^m$, and
   the processing circuitry is further configured to:
   generate shares $[k"_0], \ldots, [k"_{nk-1}]$ that become de-duplicated key attributes $k"_0, \ldots, k"_{nk-1}$ when reconstructed, using the share $\{e\}$, by setting $[k_{j,i}]$ into $[k"_{j,i}]$ when $\{e_i\}=\{1\}$ and setting a predetermined constant into $[k"_{j,i}]$ when $\{e_i\} \neq \{1\}$ for each integer i greater than or equal to 0 and smaller than or equal to m−1 and for each integer j greater than or equal to 0 and smaller than or equal to $n_k$−1,
   generate shares $[k'_0], \ldots, [k'_{nk-1}]$ that become sorted key attributes $k'_0, \ldots, k'_{nk-1}$ which are the de-duplicated key attributes $k"_0, \ldots, k"_{nk-1}$ as sorted by the permutation $\sigma_0$ and the permutation $\sigma$ in sequence when reconstructed, using the shares $[k"_0], \ldots, [k"_{nk-1}]$, the share $\{\{\sigma_0\}\}$, and the share $\{\{\sigma\}\}$,
   generate shares $[v'_0], \ldots, [v'_{na-1}]$ that become sorted value attributes $v'_0, \ldots, v'_{na-1}$ which are the value attributes $v_0, \ldots, v_{na-1}$ as sorted by the permutation $\sigma_0$ when reconstructed, using the shares $[v_0], \ldots, [v_{na-1}]$ and the share $\{\{\sigma_0\}\}$, and
   output at least one of share $\{e\}$, the share $\{\{\sigma\}\}$, shares $[k'_0], \ldots, [k'_{nk-1}]$ and shares $[v'_0], \ldots, [v'_{na-1}]$ as intermediate data which is required for one or more group-by operations that are subsequently calculated.

3. A secure computation apparatus,
   where F is an arbitrary ring; m is an integer greater than or equal to 2; $n_k$ is an integer greater than or equal to 1; and $[k_0], \ldots, [k_{nk-1}]$ are shares obtained by secret sharing of key attributes $k_0, \ldots, k_{nk-1} \in F^m$,
   the secure computation apparatus comprising processing circuitry configured to:
   generate, from a share $\{b\}$ which becomes a bit string $b:=b_0, \ldots, b_{m-1}$ obtained by bit decomposition and concatenation of the key attributes $k_0, \ldots, k_{nk-1}$ when reconstructed, a share $\{\{\sigma_0\}\}$ that becomes a permutation $\sigma_0$ for performing a stable sort of the bit string b in ascending order when reconstructed, using the shares $[k_0], \ldots, [k_{nk-1}]$;
   generate a share $\{b'\}$ that becomes a sorted bit string $b':=b'_0, \ldots, b'_{m-1}$ which is the bit string b as sorted by the permutation $\sigma_0$ when reconstructed, using the share $\{b\}$ and the share $\{\{\sigma_0\}\}$;
   generate a share $\{e\}$ that becomes a flag $e:=e_0, \ldots, e_{m-1}$ when reconstructed, using the share $\{b'\}$, by setting $\{e_i\}:=\{b'_i \neq b'_{i+1}\}$ for each integer i greater than or equal to 0 and smaller than or equal to m−2 and also setting $\{e_{m-1}\}:=\{1\}$;
   generate a share $\{\{\sigma\}\}$ that becomes a permutation $\sigma$ for performing a stable sort of negation ¬e of the flag e in ascending order when reconstructed, using the share $\{e\}$, and
   output at least one of share $\{e\}$ and the share $\{\{\sigma\}\}$ as intermediate data which is required for one or more group-by operations that are subsequently calculated.

4. A non-transitory computer-readable recording medium on which a program is recorded that, when executed on a computer, controls the computer to function as the secure computation apparatus according to claim 3.

5. A secure aggregate function computation method for execution by a secure aggregate function computation system including a plurality of secure computation apparatuses, wherein
   F is an arbitrary ring; m is an integer greater than or equal to 2; $n_k$ is an integer greater than or equal to 1; and $[k_0], \ldots, [k_{nk-1}]$ are shares obtained by secret sharing of key attributes $k_0, \ldots, k_{nk-1} \in F^m$,
   the secure aggregate function computation method comprising:
   generating, by processing circuitry of each of the secure computation apparatuses, from a share $\{b\}$ which becomes a bit string $b:=b_0, \ldots, b_{m-1}$ obtained by bit decomposition and concatenation of the key attributes $k_0, \ldots, k_{nk-1}$ when reconstructed, a share $\{\{\sigma_0\}\}$ that becomes a permutation $\sigma_0$ for performing a stable sort of the bit string b in ascending order when reconstructed, using the shares $[k_0], \ldots, [k_{nk-1}]$, generating, by the processing circuitry of each of the secure computation apparatus, a share $\{b'\}$ that becomes a sorted bit string $b':=b'_0, \ldots, b'_{m-1}$ which is the bit string b as sorted by the permutation $\sigma_0$ when reconstructed, using the share $\{b\}$ and the share $\{\{\sigma_0\}\}$, generating, by the processing circuitry of each of the secure computation apparatus, a share $\{e\}$ that becomes a flag $e:=e_0, \ldots, e_{m-1}$ when reconstructed, using the share $\{b'\}$, by setting $\{e_i\}:=\{b'_i \neq b'_{i+1}\}$ for each integer i greater than or equal to 0 and smaller than or equal to m−2 and also setting $\{e_{m-1}\}:=\{1\}$, generating, by the processing circuitry of each of the secure computation apparatus generates a share $\{\{\sigma\}\}$ that becomes a permutation $\sigma$ for performing a stable sort of negation $\neg e$ of the flag e in ascending order when reconstructed, using the share $\{e\}$, and output at least one of share $\{e\}$ and the share $\{\{\sigma\}\}$ as intermediate data which is required for one or more group-by operations that are subsequently calculated.

\* \* \* \* \*